United States Patent Office 3,485,918
Patented Dec. 23, 1969

3,485,918
NEMATOCIDAL METHOD USING ALKYLTHIO-
ALKYLPHOSPHONODITHIOATES
Marion F. Botts, Independence, Mo., and Erik K. Regel,
Mission, Kans., assignors to Chemagro Corporation,
New York, N.Y., a corporation of New York
No Drawing. Filed June 24, 1966, Ser. No. 560,097
Int. Cl. A01n 9/36
U.S. Cl. 424—216                                    10 Claims

ABSTRACT OF THE DISCLOSURE

Nematodes are killed by applying to the habitat of the nematodes a compound having the formula $$R_1SCHP\begin{matrix}O\\\|\end{matrix}\begin{matrix}SR_3\\ \\SR_3\end{matrix}$$
$$\ \ \ \ \ |$$
$$\ \ \ \ R_2$$

where $R_1$, $R_3$ and $R_4$ are alkyl or monohaloalkyl and $R_2$ is hydrogen, alkyl, monohaloalkyl, aryl, haloaryl or alkylthioalkyl. The compounds are prepared by reacting one mol of phosphorus trichloride with one mol of an aldehyde at a temperature below 0° C. and reacting this product with a mercaptan at a temperature below 0° C.

---

The present invention relates to the preparation of alkylthioalkylphosphonodithioates and the use of such compounds as nematocides.

The reaction of aldehydes with phosphorus trichloride has been investigated by several authors, e.g., Fossek, Monatshefte vol. 5, page 121 (1884), Kabashnik et al., Chem. Abst. vol. 44, page 7757 (1950), and Conant et al., Jour. Amer. Chem. Soc., vol. 42, page 2337, vol. 43, pages 1928 and 10191, vol. 44, page 2530 and vol. 146, page 192.

Phosphorus trichloride adds on to aldehydes in an exothermic reaction at temperatures below 0° C., e.g., −50° C. to −70° C. The products obtained are thermally unstable and are in equilibrium with phosphorus trichloride and aldehydes. The products have the formula:

$$RCH\!\!-\!\!PCl_2{}^+ + Cl^-\qquad\qquad (I)$$
$$\ \ \ \ \ \ \backslash\!\!\!\!\!_O\!\!\!/$$

where R is the residue of the aldehyde beyond the first carbonation.

This addition product, however, easily reacts with mercaptans. There are various possible competing reactions, including the following:

(a) mercaptal formation;
(b) trithiophosphite formation;
(c) reaction of the mercaptan with the addition product.

It has now been found that at temperatures well below 0° C., e.g., −70° to 50° C., reaction (c) is the predominant reaction.

When mercaptans are reacted with a compound of Formula I in a 1:1 mole ratio, the expected α-chloroalkylchloridophosphonothioates could not be isolated.

In similar fashion, when two moles of mercaptan were reacted with a compound of Formula I, the expected α-alkylthioalkylchloridophosphonothioates could not be isolated.

Instead, whether one mole or two moles of mercaptan were used, there was isolated only alkylthioalkyldithiophosphonates in small yields. When at least three moles of mercaptan are employed, the alkylthioalkyldithiophosphonates are obtained in good yields.

Alkylthioalkyldithiophosphonates are known compounds and are useful as defoliants, Regel patent 3,193,372. The procedure for preparing such compounds in the Regel patent, namely reacting $PCl_3$ with a hydrocarbon and a disulfide in the presence of a Friedel-Crafts catalyst, however, is relatively expensive considering the overall yields and reaction conditions employed.

Accordingly, it is an object of the present invention to develop a novel method for making alkylthioalkyldithiophosphonates.

Another object is to develop a novel method for making analogues of alkylthioalkyldithiophosphonates wherein the alkyl thio group is replaced by haloalkylthio.

A further object is to develop a method of preparing dithiophosphonates which cannot be synthesized by other routes.

An additional object is to develop a novel method for killing nematodes.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by preparing compounds having the following formula:

$$R_1SCHP\begin{matrix}O\\\|\end{matrix}\begin{matrix}SR_3\\ \\SR_4\end{matrix}\qquad(II)$$
$$\ \ \ \ \ |$$
$$\ \ \ \ R_2$$

where $R_1$, $R_3$ and $R_4$ are alkyl (including cycloalkyl) and haloalkyl and $R_2$ is hydrogen, alkyl, monohaloalkyl, aryl, haloaryl, and alkylthioalkyl. Preferably $R_1$, $R_3$ and $R_4$ do not have over six carbon atoms.

Examples of compounds suitable as nematocides within the invention are

S,S-diethyl ethylthiomethane dithiophosphonate,
S,S-dimethyl 1-methylthio ethane dithiophosphonate,
S,S-diethyl 1-ethylthioethane dithiophosphonate,
S,S-dipropyl 1-propylthioethane dithiophosphonate,
S,S-dibutyl 1-butylthioethane dithiophosphonate,
S,S-dicyclohexyl 1-cyclohexylthioethane dithiophosphonate,
S,S-dimethyl 1-methylthiopropane dithiophosphonate,
S,S-diethyl 1-ethylthiopropane dithiophosphonate,
S,S-dipropyl 1-propylthio propane dithiophosphonate,
S,S-dimethyl 1-methylthiobutane dithiophosphonate,
S,S-diethyl 1-ethylthiobutane dithiophosphonate,
S,S-dihexyl 1-hexylthiobutane dithiophosphonate,
S,S-dimethyl 1-methylthio 2-ethylhexane dithiophosphonate,
S,S,-diethyl 1-ethylthio 3-chlorobutane dithiophosphonate,
S,S-diethyl 1-ethylthio 2-chlorobutane dithiophosphonate,
S,S,-diethyl 1-ethylthio 2-ethylthiobutane dithiophosphonate,
S,S-dimethyl 1-methylthiophenylmethane dithiophosphonate,
S,S-diethyl 1-ethylthio phenylmethane dithiophosphonate,
S,S-dibutyl 1-butylthio phenylmethane dithiophosphonate,
S,S-diethyl 1-ethylthio p-chlorophenylmethane dithiophosphonate,
S,S-diethyl propylthio methane dithiophosphonate,
S,S-diethyl butylthiomethane dithiophosphonate,
S,S-dibutyl ethylthiomethane dithiophosphonate,
S,S-dibutyl butylthiomethane dithiophosphonate,
S,S-di(3-chloropropyl) 1-(3′-chloropropylthio)ethane dithiophosphonate,
S,S-diethyl 1-ethylthio 3-chloropropane dithiophosphonate, S,S-diethyl 1-cyclohexylthio propane dithiophosphonate,
S,S-dimethyl 3-ethylthio propane dithiophosphonate,
S,S-dimethyl-1-methylthio-m-bromophenylmethane dithiophosphonate,
S,S-diamyl 1-amylthio o-chlorophenylmethane dithiophosphonate,
S,S-diisopropyl 1-isopropylthio p-tolylmethane dithiophosphonate,
S,S-diethyl 1-ethylthio 2-methylpropane dithiophosphonate,
S,S-dimethyl 1-methylthio 2′,6′-dichlorophenylmethane dithiophosphonate,
S,S-dimethyl-1,3 di(ethylthio) propane dithiophosphonate.

As aldehydes for the reaction, there can be used formaldehyde (including trioxane and paraformaldehyde), acetaldehyde, propionaldehyde, butyraldehyde, isobutyraldehyde, valeraldehyde, hexaldehyde, 3-methylthiopropionaldehyde, 2-ethylhexanal, 2-chlorobutyraldehyde, 3-chlorobutyraldehyde, 2-ethylthiobutyraldehyde, benzaldehyde, 2-butylthioacetaldehyde, p-chlorobenzaldehyde, o-chlorobenzaldehyde, m-bromobenzaldehyde, 2,6-dichlorobenzaldehyde, 3-ethylthiopropionaldehyde, 3-chloropropionaldehyde, p-tolualdehyde, o-tolualdehyde, 2,4,6-trichlorobenzaldehyde, 3-ethylthiopropionaldehyde.

As mercaptans there can be used methyl mercaptan, ethyl mercaptan, propyl mercaptan, butyl mercaptan, amyl mercaptan, cyclohexyl mercaptan, 3-chloropropyl mercaptan, isobutyl mercaptan, secondary butyl mercaptan, octyl mercaptan, 2-chlorobutyl mercaptan, 3-bromobutyl mercaptan.

If a mixture of mercaptans are employed for reaction with the aldehyde the product obtained in Formula II will be a mixture in which $R_1$, $R_3$ and $R_4$ need not be alike. However, if a single mercaptan is used, then $R_1$, $R_3$ and $R_4$ will be identical. $R_2$ in the formula is dependent upon the aldehyde employed.

The preparation of alkylthioalkyl dithiophosphonates by the reaction of at least three moles of mercaptan with 1 mole of aldehyde gives particularly good yields with lower aliphatic aldehydes having at least two carbon atoms, the yields in some cases exceeding 80%. Aromatic aldehydes also have been found to give good yields of the desired product and monohalo aliphatic aldehydes have been found to give yields up to 60%.

While more than 3 moles of mercaptan, e.g. 4, 5 or 6 moles, can be used per mole of aldehyde there generally is no advantage in doing so and the excess mercaptan must be recovered.

The yields of the alkylthioalkyl dithiophosphonates using formaldehyde as the aldehyde generally are low. This is also the case when employing alkylthio aliphatic aldehydes, e.g. 3-ethylthiobutanal.

The reaction does not work with aldehydes having $\alpha,\beta$-aliphatic unsaturation. Chloral was inoperative and formed the mercaptal instead under the described reaction conditions.

The present invention is suitable for preparing dithiophosphonates which cannot be synthesized by other routes or which can be synthesized only with difficulty by other methods.

The reaction of the aldehyde with mercaptan can be carried out in the presence of a solvent, e.g. benzene, toluene, carbon tetrachloride, chloroform or the like although this is not essential.

The general procedure employed to prepare the alkylthioalkyl dithiophosphonates was as follows:

GENERAL PROCEDURE

Phosphorus trichloride was placed in a three necked flask equipped with a thermometer, stirrer, condenser and dropping funnel. External cooling was provided by an acetone-dry ice bath. At −70° C. the aldehyde was added slowly while agitating the phosphorus trichloride. The temperature was kept at −70° C. by adjusting the addition rate of the aldehyde. After addition of the aldehyde was completed the reaction mixture was agitated for 1 hour at −70° C.

Then the mercaptan was added dropwise at −70° C. to −60° C. The reaction mixture was then allowed to warm up to −40° C. where hydrogen chloride began to evolve, and the reaction mixture was agitated for 1 hour after the addition was completed.

Finally the reaction mixture was slowly brought up to room temperature and without agitation allowed to stand for several hours. The crude product was then washed with water until neutral, dried and distilled in a high vacuum.

In order to separate small amounts of mercaptals from the desired dithiophosphonate, the crude product is preferably redistilled or fractionated over a small Vigreaux column.

EXAMPLE 1

Using the general procedure 1 mole (137.39 grams) of phosphorus trichloride was reacted with 30 grams of paraformaldehyde (equivalent to 1 mole of formaldehyde). There was then added dropwise 3 moles (186 grams) of ethyl mercaptan. The product was S,S-diethyl ethylthiomethane dithiophosphonate B.P.$_{0.1}$ 120° C., $n_D^{25}$ 1.5652, Code No. 6480, yield 19%.

EXAMPLE 2

The same product as that of Example 1 was prepared by an alternate procedure, namely, reacting 1 mole of sodium ethyl mercaptide with 1 mole of S,S-diethyl chloromethane dithiophosphonate, filtered to remove sodium chloride and washed with water to produce S,S-diethyl ethylthiomethane dithiophosphonate, B.P.$_{0.03}$ 123° C., $n_D^{25}$ 1.5646. This product was given the Code No. 6435 and was obtained in a yield of 29%.

EXAMPLE 3

Using the general procedure 1 mole of phosphorus trichloride was reacted with 1 mole of acetaldehyde. There was then added 3 moles of methyl mercaptan. The product was S,S-dimethylmethylthioethane dithiophosphonate B.P.$_{0.04}$ 110° C., $n_D^{25}$ 1.5996, Code No. 6483, yield in excess of 70%.

EXAMPLE 4

Using the general procedure 1 mole of phosphorus trichloride was reacted with 1 mole of acetaldehyde. There was then added dropwise 3 moles of ethyl mercaptan. The product was S,S-diethyl ethylthionethane dithiophosphonate, B.P.$_{0.007}$ 119° C., $n_D^{25}$ 1.5568, Code No. 6482, yield 70%.

EXAMPLE 5

Using the general procedure 1 mole of phosphorus trichloride was reacted with 1 mole of acetaldehyde. There was then added dropwise 3 moles of propyl mercaptan. The product was S,S-dipropyl propylthioethane dithiophosphonate, B.P.$_{0.002}$ 132° C., $n_D^{25}$ 1.5385, Code No. 6443, yield 65%.

EXAMPLE 6

Using the general procedure 1 mole of phosphorus trichloride was reacted with 1 mole of acetaldehyde. There was then added dropwise 3 moles of butyl mercaptan. The product was S,S-dibutyl butylthioethane dithiophosphonate, B.P.$_{0.18}$ 155° C., $n_D^{25}$ 1.5283, Code No. 6438, yield 68%.

EXAMPLE 7

Using the general procedure 1 mole of phosphorus trichloride was reacted with 1 mole of acetaldehyde. There was then added dropwise 3 moles of cyclohexyl mercaptan. The product was S,S-dicyclohexyl cyclohexylthioethane dithiophosphonate, a high boiling oil, $n_D^{25}$ 1.5692, Code No. 6513, yield 82%.

EXAMPLE 8

Using the general procedure 1 mole of phosphorus trichloride was reacted with 1 mole of propionaldehyde. There was then added 3 moles of methyl mercaptan. The product was S,S-dimethyl 1-methylthiopropane dithiophosphonate, B.P.$_{0.06}$ 120° C., $n_D^{25}$ 1.5850, Code No. 6514, yield 33%.

EXAMPLE 9

Using the general procedure 1 mole of phosphorus trichloride was reacted with 1 mole of propionaldehyde. There was then added dropwise 3 moles of ethyl mercaptan. The product was S,S-diethyl 1-ethylthiopropane dithiophosphonate, B.P.$_{0.07}$ 120° C., $n_D^{25}$ 1.5536, Code No. 6518, yield 30%.

EXAMPLE 10

Using the general procedure 1 mole of phosphorus trichloride was reacted with 1 mole of propionaldehyde. There was then added dropwise 3 moles of propyl mercaptan. The product was S,S-dipropyl 1-propylthiopropane dithiophosphonate, B.P.$_{0.03}$ 140° C., $n_D^{25}$ 1.5363, Code No. 6519.

EXAMPLE 11

Using the general procedure 1 mole of phosphorus trichloride was reacted with 1 mole of butyraldehyde. There was then added dropwise 3 moles of methyl mercaptan. The product was S,S-dimethyl 1-methylthiobutane dithiophosphonate, B.P.$_{0.03}$ 120° C., $n_D^{25}$ 1.5700, Code No. 6515, yield 20%.

EXAMPLE 12

Using the general procedure 1 mole of phosphorus trichloride was reacted with 1 mole of butyraldehyde. There was then added dropwise 3 moles of ethyl mercaptan. The product was S,S-diethyl 1-ethylthiobutane dithiophosphonate, B.P.$_{0.03}$ 130° C., $n_D^{25}$ 1.5475, Code No. 6440, yield 50%.

EXAMPLE 13

Using the general procedure 1 mole of phosphorus trichloride was reacted with 1 mole of 2-ethylhexanal. There was then added 3 moles of methyl mercaptan. The product was S,S-dimethyl 1-methylthio-2-ethylhexane dithiophosphonate, B.P.$_{0.01}$ 128° C., $n_D^{25}$ 1.5478, Code No. 6441, yield 13%.

EXAMPLE 14

Using the general procedure 1 mole of phosphorus trichloride was reacted with 1 mole of 3-chlorobutyraldehyde. There was then added dropwise 3 moles of ethyl mercaptan. The product was S,S-diethyl 1-ethylthio-3-chlorobutane dithiophosphonate, B.P.$_{0.01}$ 145° C., $n_D^{25}$ 1.5550, Code No. 6476, yield 22%.

EXAMPLE 15

Using the general procedure 1 mole of phosphorus trichloride was reacted with 1 mole of 3-ethylthiobutyraldehyde. There was then added dropwise 3 moles of ethyl mercaptan. The product was S,S-diethyl 1-ethylthio 3-ethylthiobutane dithiophosphonate (also called S,S-diethyl 1,3-di(ethylthio) butane dithiophosphonate), B.P.$_{0.08}$ 169° C., $n_D^{25}$ 1.5580. Code No. 6477, yield 22%.

EXAMPLE 16

Using the general procedure 1 mole of phosphorus trichloride was reacted with 1 mole of benzaldehyde. There was then added dropwise 3 moles of methyl mercaptan. The product was S,S-dimethyl 1-methylthio phenylmethane dithiophosphonate, M.P. 90° C., Code No. 6516.

EXAMPLE 17

Using the general procedure 1 mole of phosphorus trichloride was reacted with 1 mole of benzaldehyde. There was then added dropwise 3 moles of ethyl mercaptan. The product was S,S-diethyl 1-ethylthio phenylmethane dithiophosphonate, B.P.$_{0.01}$ 170° C., $n_D^{25}$ 1.6015, Code No. 6450, yield 30%.

EXAMPLE 18

Using the general procedure 1 mole of phosphorus trichloride was reacted with 1 mole of benzaldehyde. There was then added dropwise 3 moles of butyl mercaptan. The product was S,S-dibutyl 1-butylthio phenylmethane dithiophosphonate, a heavy oil $n_D^{25}$ 1.5563, Code No. 6517, yield 94%.

EXAMPLE 19

Using the general procedure 1 mole of phosphorus trichloride was reacted with 1 mole of p-chlorobenzaldehyde. There was then added dropwise 3 moles of ethyl mercaptan. The product was S,S,-diethyl 1-ethylthio p-chlorophenylmethane dithiophosphonate, B.P.$_{0.02}$ 170° C., $n_D^{25}$ 1.6048, Code No. 6921.

EXAMPLE 20

Using the general procedure 1 mole of phosphorus trichloride was reacted with 1 mole of acetaldehyde. There was then added dropwise 3 moles of 3-chloropropyl mercaptan. The product was S,S-di (3'-chloropropyl) 1-3'-chloropropylthioethane dithiophosphonate, a heavy oil, Code No. 6444.

EXAMPLE 21

Using the general procedure 1 mole of phosphorus trichloride was reacted with 1 mole of 3-ethylthiopropionaldehyde. There was then added 3 moles of methyl mercaptan. The product was S,S-dimethyl 1-methylthio 3-ethylthiopropane dithiophosphonate, a heavy oil, Code No. 6445.

EXAMPLE 22

The procedure of Example 3 was repeated. The product was given the Code No. 6436.

EXAMPLE 23

The procedure of Example 4 was repeated. The product was given the Code No. 6437.

EXAMPLE 24

The procedure of Example 9 was repeated. The product was given the Code No. 6439.

EXAMPLE 25

Using the general procedure 1 mole of phosphorus trichloride was reacted with 1 mole of 3-chloropropionaldehyde. There was then added dropwise 3 moles of ethyl mercaptan. The product was S,S-diethyl 1-ethylthio 3-chloropropane dithiophosphonate, a heavy oil, Code No. 6475.

EXAMPLE 26

1 mole of sodium propyl mercaptide was reacted with 1 mole of S,S-diethyl chloromethane dithiophosphonate using the procedure of Example 2 to produce S,S-diethyl propylthiomethane dithiophosphonate as an oil, Code No. 6470.

Alternatively, Code No. 6470 can be prepared in low yields by the general procedure reacting 1 mole of phosphorus trichloride with 30 grams of paraformaldehyde (1 mole of formaldehyde) followed by the dropwise addition of a mixture of 2 moles of ethyl mercaptan and 1 mole of propyl mercaptan.

EXAMPLE 27

1 mole of sodium butyl mercaptide was reacted with 1 mole of S,S-diethyl chloromethane dithiophosphonate using the procedure of Example 2 to produce S,S-diethyl butylthiomethane dithiophosphonate as an oil, Code No. 6471.

Alternatively, Code No. 6471 can be prepared in low yields by the general procedure reacting 1 mole of phosphorus trichloride with 30 grams of paraformaldehyde followed by the dropwise addition of a mixture of 2 moles of ethyl mercaptan and 1 mole of butyl mercaptan.

EXAMPLE 28

1 mole of sodium ethyl mercaptide was reacted with 1 mole of S,S-dibutyl chloromethane dithiophosphonate using the procedure of Example 2 to produce S,S-dibutyl ethylthiomethane as an oil, Code No. 6472.

Alternatively, Code No. 6472 can be prepared in low yields by the general procedure reacting 1 mole of phosphorus trichloride with 30 grams of paraformaldehyde followed by the dropwise addition of a mixture of 2 moles butyl mercaptan and 1 mole of ethyl mercaptan.

EXAMPLE 29

1 mole of sodium butyl mercaptide was reacted with 1 mole of S,S-dibutyl chloromethane dithiophosphonate using the procedure of Example 2 to produce S,S-dibutyl butylthiomethane dithiophosphonate as an oil, Code No. 6473.

Alternatively, Code No. 6473 can be prepared in low yields by the general procedure reacting 1 mole of phosphorus trichloride with 30 grams of paraformaldehyde followed by the dropwise addition of 3 moles of butyl mercaptan.

The compounds of the present invention can be used alone as nematocides but it has been found desirable to apply them to the pest, e.g. to the soil habitat of nematodes, together with inert solids to form dusts, or, preferably water. There can also be added surface active agents and inert solids in such liquid formulations. Desirably, 0.05 to 1% by weight of surface active agent is employed. The active ingredient can be from 0.01 to 95% by weight of the entire composition in such cases.

In place of water there can be employed organic solvents as carriers, e.g., hydrocarbons such as benzene, toluene, xylene, kerosene, diesel oil, fuel oil, and petroleum naphtha, ketones such as acetone, methyl ethyl ketone and cyclohexanone, alcohols, e.g., ethanol, isopropanol and amyl alcohol, etc.

The nematocides of the present invention can also be applied with inert nematocidal adjuvants or carriers such as talc, pyrophyllite, synthetic fine silica, Attaclay, kieselguhr, chalk, diatomaceous earth, lime, calcium carbonate, bentonite, fuller's earth, cottonseed hulls, wheat flour, soybean flour, pumice, tripoli, wood flour, walnut shell flour, redwood flour and lignin.

It is frequently desirable to incorporate a surface active agent in the pesticidal compositions of this invention. Such surface active agents, i.e., wetting agent, are advantageously employed in both the solid and liquid compositions. The surface active agent can be anionic, cationic or nonionic in character.

Typical classes of surface active agents include alkyl sulfonate salts, alkylaryl sulfonate salts, alkyl sulfate salts, alkylamide sulfonate salts, alkylaryl polyether alcohols, fatty acid esters of polyhydric alcohols and the alkylene oxide addition products of such esters, and addition products of long chain mercaptans and alkylene oxides. Typical examples of such surface active agents include the sodium alkyl benzene sulfonates having 14 to 18 carbon atoms in the alkyl group, alkyl-phenolethylene oxide condensation products, e.g., p-isooctylphenol condensed with 10 ethylene oxide units, soaps, e.g., sodium stearate and potassium oleate, sodium salt of propylnaphthalene sulfonic acid, (di-2-ethyl hexyl) ester of sodium sulfosuccinic acid, sodium lauryl sulfate, sodium salt of the sulfonated monoglyceride of cocoanut fatty acids, sorbitan sesquioleate, lauryl trimethyl ammonium chloride, octadecyl trimethyl ammonium chloride, polyethylene glycol lauryl ether, polyethylene esters of fatty acids and rosin acids, e.g., Ethofat 7 and 13, sodium N-methyl-N-oleyltaurate, Turkey red oil, sodium dibutylnaphthalene sulfonate, sodium lignin sulfonate (Marasperse N), polyethylene glycol stearate, sodium dodecylbenzene sulfonate, tertiary dodecyl polyethylene glycol thioether (Nonionic 218), long chain ethylene oxide propylene oxide condensation products, e.g., Pluronic 61, sorbitan monolaurate, polyethylene glycol ester of tall oil acids, sodium octylphenoxyethoxyethyl sulfate, tris(polyoxyethylene) sorbitan monostearate (Tween 60), sodium dihexyl sulfosuccinate.

The solid and liquid formulations can be prepared by any of the conventional methods. Thus, the active ingredient can be mixed with the solid carrier in finely divided form in amounts small enough to preserve the free-flowing property of the final dust composition.

In commercial practice the compositions containing the nematocides of the present invention are applied to the soil infested with nematodes.

In the following examples or tables illustrating nematocidal activity the compounds of the invention were formulated as wettable powders consisting of 50% of the compound being tested, 46% Hi-Sil 233 (ultrafine silica), 2% Maresperse N(sodium lignin sulfonate) and 2% Pluronic L-61 (polyethylene oxide-propylene oxide adduct molecular weight about 1000). This wettable powder is hereinafter designated as Formulation A.

EXAMPLE 30

The saprophytic nematode tests were carried out in water as the medium with Panagrellus and Rhabditis spp. at room temperature utilizing Formulation A. The results are recorded as percent kill at the indicated dosages in parts per million after a 4 day incubation period. A 10% kill is merely the same amount of kill as occurs with a blank sample.

TABLE I

| Compound | Example | NESA at p.p.m. | | |
|---|---|---|---|---|
| | | 100 | 50 | 10 |
| 6435 | 1 | 80 | 30 | 10 |
| 6480 | 2 | 80 | 30 | 10 |
| 6470 | 26 | 100 | 50 | 10 |
| 6471 | 27 | 100 | 50 | 10 |
| 6472 | 28 | 100 | 50 | 10 |
| 6473 | 29 | 100 | 50 | 10 |
| 6436 | 22 | 100 | 100 | 100 |
| 6437 | 23 | 80 | 50 | 10 |
| 6443 | 5 | 100 | 80 | 50 |
| 6444 | 20 | 100 | 80 | 30 |
| 6438 | 6 | 50 | 10 | 10 |
| 6439 | 24 | 50 | 10 | 10 |
| 6440 | 12 | 100 | 50 | 10 |
| 6441 | 13 | 30 | 10 | 10 |
| 6475 | 25 | 50 | 10 | 10 |
| 6450 | 17 | 50 | 10 | 10 |
| 6445 | 21 | 80 | 50 | 10 |
| 6483 | 3 | 80 | 80 | 50 |
| 6482 | 4 | 30 | 10 | 10 |
| 6513 | 7 | 30 | 10 | 10 |
| 6514 | 8 | 100 | 100 | 30 |
| 6515 | 11 | 100 | 100 | 30 |
| 6516 | 16 | 80 | 80 | 50 |
| 6517 | 18 | 80 | 50 | 30 |
| 6518 | 9 | 100 | 100 | 80 |
| 6519 | 10 | 100 | 100 | 80 |

EXAMPLE 31

Some of the compounds were also tested against parasitic nematodes employing Formulation A. The nematode employed was Meloidogyne spp. and the procedure was a 10 day contact test carried out in a water-agar medium in the presence of tomato roots at room temperature. The results are given on a 0–10 scale where 0 indicates the presence of severe knotting, i.e. no effectiveness and 10 indicates no knots, i.e. 100% effectiveness. The dosages are at the indicated concentrations of test compound in parts per million.

TABLE II

| Compound | Example | NEMA at p.p.m. | | | |
|---|---|---|---|---|---|
| | | 50 | 25 | 12 | 6 |
| 6480 | 2 | 10 | 10 | 7.6 | 5 |
| 6470 | 26 | 10 | 10 | 0 | 0 |
| 6471 | 27 | 10 | 10 | 0 | 0 |
| 6472 | 28 | 8 | 0 | 0 | 0 |
| 6473 | 29 | 5 | 0 | 0 | 0 |
| 6436 | 22 | 8.8 | 0 | 0 | 0 |
| 6437 | 23 | 8.8 | 0 | 0 | 0 |
| 6443 | 5 | 10 | 10 | 10 | 8.8 |
| 6439 | 24 | 8.8 | 0 | 0 | 0 |
| 6518 | 9 | 10 | 0 | 0 | 0 |

We claim:
1. A process of killing nematodes comprising applying to the nematodes a nematocidally effective amount of a compound having the formula

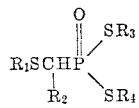

where $R_1$, $R_3$ and $R_4$ are selected from the group consisting of lower alkyl, monochloro lower alkyl and monobromo lower alkyl and $R_2$ is selected from the group consisting of hydrogen, lower alkyl, monochloro lower alkyl, phenyl, methyl phenyl, chloro phenyl, bromophenyl and lower alkyl thio lower alkyl.

2. A process according to claim 1 wherein the compound is applied to nematodes in soil.

3. A process according to claim 1 wherein $R_2$ is selected from the group consisting of hydrogen, lower alkyl, monochloro lower alkyl, phenyl, methyl phenyl, chloro phenyl, bromophenyl and lower alkyl thio lower alkyl.

4. A process according to claim 1 wherein $R_1$, $R_3$ and $R_4$ are lower alkyl.

5. A process according to claim 4 wherein $R_2$ is lower alkyl.

6. A process according to claim 5 wherein $R_1$, $R_3$ and $R_4$ are the same.

7. A process according to claim 4 wherein the compound is applied to soil infested with saprophytic nematodes.

8. A process according to claim 4 wherein the compound is applied to soil infested with parasitic nematodes.

9. A process according to claim 4 wherein two $R_1$, $R_3$ and $R_4$ are ethyl and the remaining member of $R_1$, $R_3$ and $R_4$ is selected from the group consisting of propyl and butyl and $R_2$ is lower alkyl.

10. A process according to claim 4 wherein $R_1$, $R_3$ and $R_4$ are all ethyl and $R_2$ is lower alkyl.

References Cited

UNITED STATES PATENTS

| 3,193,372 | 7/1965 | Regel | 71—71 |
| 3,112,244 | 11/1963 | Goyette | 167—22 |
| 3,112,271 | 11/1963 | Calhoun | 252—46.6 |
| 3,162,570 | 12/1964 | Wilson | 167—22 |
| 3,233,754 | 12/1965 | Cölin et al. | 260—948 |

ALBERT T. MEYERS, Primary Examiner

D. R. MAHANAND, Assistant Examiner

U.S. Cl. X.R.

424—357